March 22, 1932.  O. N. GREDELL  1,850,546
HEATER FOR TRUCK TANKS
Filed Nov. 11, 1929
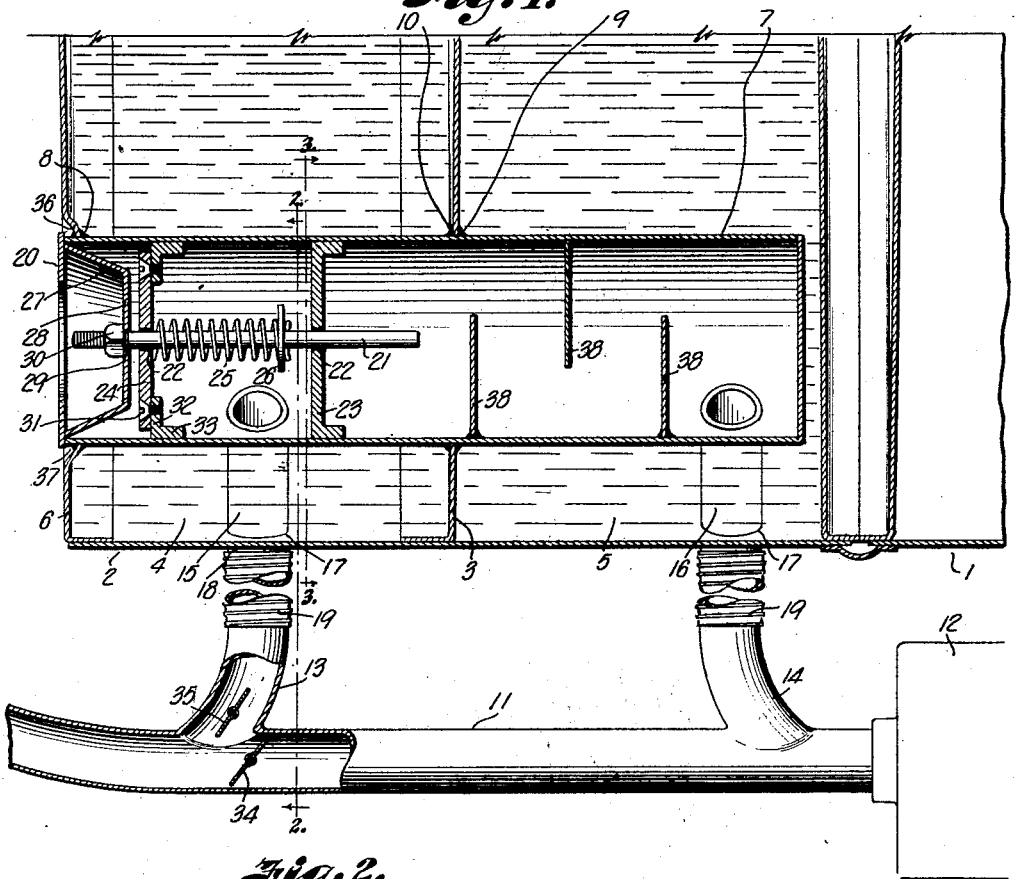
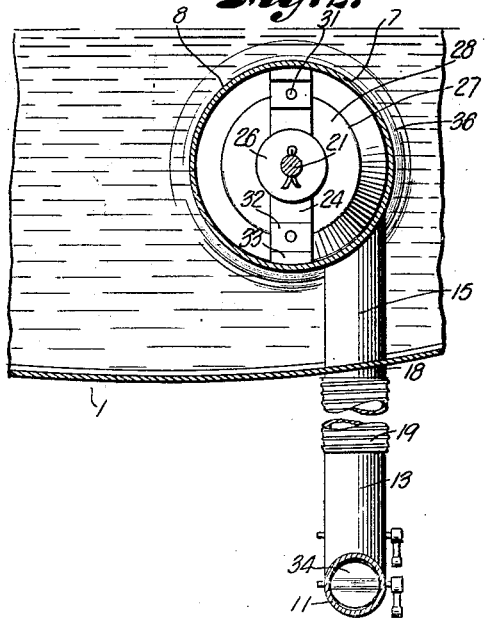
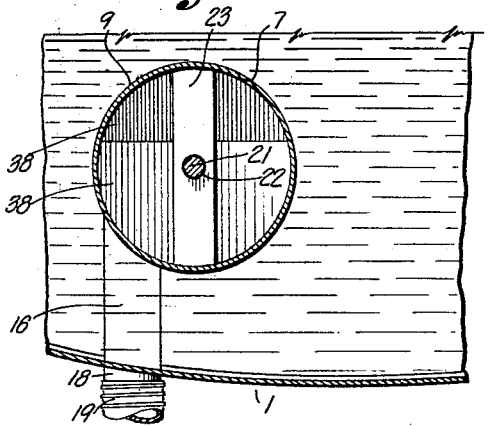
INVENTOR
Otto N. Gredell
BY
ATTORNEY Patented Mar. 22, 1932

1,850,546

UNITED STATES PATENT OFFICE

OTTO N. GREDELL, OF KANSAS CITY, MISSOURI, ASSIGNOR TO STANDARD STEEL WORKS, OF NORTH KANSAS CITY, MISSOURI, A CORPORATION OF MISSOURI

HEATER FOR TRUCK TANKS

Application filed November 11, 1929. Serial No. 406,342.

My invention relates to heating devices and more particularly to devices for employing exhaust gases from an engine for heating purposes, the principal objects of the invention being to employ exhaust gases from a truck engine for heating the contents of containers supported by the truck.

In distributing lubricating oil particularly for the use of airplanes, it is desirable that the temperature of the lubricant when delivered be approximately that of the lubricant in the airplane engine for which the fresh lubricant is intended. Lubricant delivered from a truck tank is normally at atmospheric temperature and must be transferred to an intermediate container to be heated, or delivered from the tank or an intermediate container at a temperature below that desired for efficient service in the engine of an airplane arriving at a field in heated condition.

Further objects of my invention therefore are to heat lubricating oil while it is being transported so that it will be in suitable condition for delivery to an airplane, to effect the heating of the lubricant by the exhaust gases of the truck engine and to obviate hazard of rupture of heater walls due to backfiring in the exhaust conduit of the engine.

In accomplishing these and other objects of the invention, I have provided improved details of structure, the preferred forms of which are illustrated in the accompanying drawings, wherein:

Fig. 1 is a longitudinal vertical central section through a portion of a truck tank containing my improved heater and adjacent portions of exhaust conduits.

Fig. 2 is a fragmentary cross section on the line 2—2, Fig. 1.

Fig. 3 is a section on the line 3—3, Fig. 1.

Referring in detail to the drawings:

1 designates a tank including a portion 2 ordinarily provided for containing lubricating oil and having a partition 3 forming a plurality of compartments 4 and 5. The lubricant portion of the tank is ordinarily formed on the front end thereof and the end wall 6 is spaced slightly from the cab of the truck.

My invention includes an elongated tubular housing 7 forming a chamber extending longitudinally in the lubrication compartments of the tank through openings 8 and 9 in the partition and end walls 3 and 6 respectively and secured to the partition and end wall by welding, as indicated at 10.

A tank of this character is ordinarily transported on a motor truck having an engine provided with an exhaust conduit such as 11 for conducting products of combustion to a muffler 12. I provide the exhaust conduit with branch lines including an inlet line 13 and an outlet line 14 and connect the lines with the housing for by-passing products of combustion through the chamber to heat the lubricating oil in the compartments of the tank.

Metal tubes 15 and 16 are preferably connected to the longitudinal wall of the housing adjacent opposite ends thereof in communication with the housing and extend through the adjacent portion of the tank and through openings 17 in the tank wall to form projecting nipples 18 to which flexible tubing 19 may be attached for connecting the nipples with the exhaust conduit lines.

The housing has a front open end located in the end wall of the tank and I provide a valve including a plate 20 yieldingly held against the end of the housing for closing the same to provide relief in case of backfire in the exhaust conduit or in the chamber.

The valve includes a stem 21 mounted in guide openings 22 formed in cross bars 23 and 24 fixed to the inner surface of the housing whereby the stem moves on the axis of the housing. A spring 25 mounted on the stem and anchored to a disk 26 thereon bears against the outer bar 24 for yieldingly retaining the valve in chamber closing position.

The valve further includes a recessed bracket plate 27 shaped like a truncated cone and having a web 28 provided with an opening 29 in which the threaded outer end of the stem is slidable, the stem being anchored to the web by a nut 30. The outer bar 24 is preferably removably secured by screws 31 to flanges 32 of brackets 33 attached to the housing for convenient removal of the assembly for access to the space between the bars and to the inlet 13.

A valve 34 is located in the exhaust conduit adjacent the inlet line 13 for directing the exhaust gases into the by-passing lines and a valve 35 in the lower end of the inlet line 13 is adapted to close the line and restrain the gases to passage in the normal exhaust conduit.

The inlet line 13 is formed arcuately at its lower end to provide curved guide walls for promoting flow of exhaust gases from the exhaust conduit into the line and the outlet line 14 is oppositely curved at its point of connection with the conduit to facilitate outflow of gases from the housing into the conduit.

The end wall 6 of the tank is preferably provided with an inpressed flange 36 around the opening 8, forming an annular recess 37 to receive the radially projecting flange-like edge of the plate 20. The end of the housing may thus extend beyond the abutting edge of the end wall to receive the valve plate 20, and will still be located substantially in the plane of the end wall 6.

Baffles 38 are located in staggered relation on the housing to form a tortuous path for gases moving from the inlet to the outlet thereof.

In using apparatus constructed as described, the compartments in the tank may be filled with different grades of lubricating oil and the valves adjusted so that the exhaust from the engine of the truck will heat the lubricant while the tank is being transported to the airport.

If for any reason a backfire occurs in the exhaust conduit, the expanding gases bear against the relief valve and open the same to relieve pressure in the heating chamber.

The lubricant may be heated by operation of the tank engine sufficiently for transfer to an airplane engine to replace lubricant heated by operation of the engine and to avoid cooling of the airplane engine when the lubricant is introduced thereinto. It is apparent that the temperature of the lubricant may be raised to the desired degree while a tank is transporting the lubricant or while the truck is standing at the port, and that the heating medium may be derived from another source than an engine on a truck.

Attention is called to the mounting of the housing in the openings of the partition and end wall of the tank whereby the houisng is securely attached to the tank and firmly supported without recourse to supplemental brackets.

The nut on the outer end of the valve stem is accessible through the aperture in the valve plate 20 and may be removed for slipping the conoidal web of the valve over and away from the stem. The bar 24 is then accessible and the screws which attach it to the small brackets may be removed for removing the bar from the stem to release the spring and for removing the stem and spring from the housing.

What I claim and desire to secure by Letters Patent is:

1. In a lubricant heater for tank trucks, in combination with a lubricant containing tank having an opening in a wall thereof and an exhaust conduit, a heating chamber in the tank having communication therewith, and means including inlet and outlet tubes connecting the chamber with the exhaust conduit for by-passing products of combustion through the chamber and a valve for normally closing said opening and operable to relieve excessive pressure in the chamber.

2. In combination with a tank, a chamber mounted in the tank having an open end mounted in one wall of the tank, means for circulating a heating medium through the chamber, and a spring-pressed valve closing the open end of the chamber.

3. In apparatus of the character described including a tank having a wall provided with an opening, a heating chamber in the tank having a portion communicating with atmosphere through said opening and means for passing a heating medium through the heating chamber, a valve including a recessed plate having tapering walls and a flange closing the opening, a stem engaged with said plate, and guides in said chamber for the stem.

4. In apparatus of the character described, a tank having an end wall provided with an opening and an inpressed flange surrounding the opening, a heating chamber in the tank having an open outer end mounted in said opening, the outer edge of the chamber projecting beyond the flange, a spring-pressed relief valve including a plate engaging the outer edge of the chamber normally closing the chamber, and means for passing a heating medium through the chamber.

5. In apparatus of the character described including an exhaust conduit, a tank having an end wall provided with an opening and an inpressed flange surrounding the opening, a heating chamber in the tank having an open outer end mounted in said opening, the outer edge of the chamber projecting beyond the flange, a spring-pressed relief valve including a plate engaging the outer edge of the chamber normally closing the chamber, and means for passing gases from the exhaust conduit through the heating chamber.

6. In apparatus of the character described, a tank having an end wall provided with an opening, a heating chamber in the tank having an open outer end mounted in said opening, a relief valve including an apertured plate engaging the outer edge of the chamber and a recessed plate secured to the apertured plate, spring-pressed means extending through the recessed plate and accessible through said aperture for holding the valve in chamber closing position, and means for passing a heating medium through the chamber.

7. In apparatus of the character described including a tank and a conduit for conducting a heating medium, an elongated chamber in the tank having an open end mounted in one wall of the tank and communicating with atmosphere, means for circulating the heating medium from the conduit through the chamber, and means including brackets in the chamber and a valve having a stem guidably mounted in the brackets yieldingly closing the open end of the chamber.

8. In combination with a truck tank and an exhaust conduit, a heating chamber in the tank and having an open end communicating with atmosphere through a wall of the tank, means for by-passing hot gases from the exhaust conduit through the chamber, a pressure relief valve closing the open end of the chamber, a spring in the chamber for retaining the valve closed, and means for adjusting tension of the spring exteriorly of the tank.

9. In combination with a truck tank and an exhaust conduit, a heating chamber in the tank and having an open end communicating with atmosphere through a wall of the tank, means for by-passing hot gases from the exhaust conduit through the chamber, a pressure relief valve closing the open end of the chamber, a valve stem slidably supported within the chamber and having a threaded end extending through the valve, a spring on the stem for normally closing the valve, and means threaded onto the stem and engaging the valve for tensioning the spring.

10. In combination with a truck tank and an exhaust conduit, a heating chamber in the tank and having an opening in direct communication with atmosphere exteriorly of the tank, means for bypassing hot gases from the exhaust conduit through the chamber, and a pressure relief valve closing the opening to atmosphere.

11. In combination with a truck tank and an exhaust conduit, a heating chamber in the tank and having an opening in direct communication with atmosphere exteriorly of the tank, means including an inlet and outlet tubes connecting the heating chamber with the exhaust conduit for bypassing hot gases through the chamber, and a valve for normally closing said opening and operable by pressure in the heating chamber to relieve excessive pressures in said chamber.

In testimony whereof I affix my signature.

OTTO N. GREDELL.